United States Patent [19]

Oates et al.

[11] 4,114,077
[45] Sep. 12, 1978

[54] ROTOR OVERTEMPERATURE PROTECTION FOR ELECTRIC MOTORS

[75] Inventors: Robert M. Oates, Murrysville; Raymond W. Mackenzie, Baldwin Borough, both of Pa.

[73] Assignee: Westinghouse Electric Corp., Pittsburgh, Pa.

[21] Appl. No.: 783,525

[22] Filed: Apr. 1, 1977

[51] Int. Cl.² .............................................. H02P 1/04
[52] U.S. Cl. ................................................. 318/473
[58] Field of Search ............... 318/473, 472, 471, 445, 318/478

[56] References Cited
U.S. PATENT DOCUMENTS 3,358,208  12/1967  Takami .................................. 318/473

Primary Examiner—Herman J. Hohauser
Attorney, Agent, or Firm—G. H. Telfer

[57] ABSTRACT

A system is provided for preventing overtemperature of the rotor bars of large squirrel-cage induction motors. A transmitter is mounted on the rotor and supplied with power from the rotor winding itself by a special current transformer. The transmitter is controlled by a temperature sensing element which causes it to transmit a signal in response to excessive temperature, and a slip frequency signal is also transmitted as a reliability check. A stationary receiver picks up the signal from the transmitter and includes circuitry for deenergizing the motor in response to the excessive temperature signal and for preventing energization of the motor if the slip frequency signal is not received.

9 Claims, 4 Drawing Figures

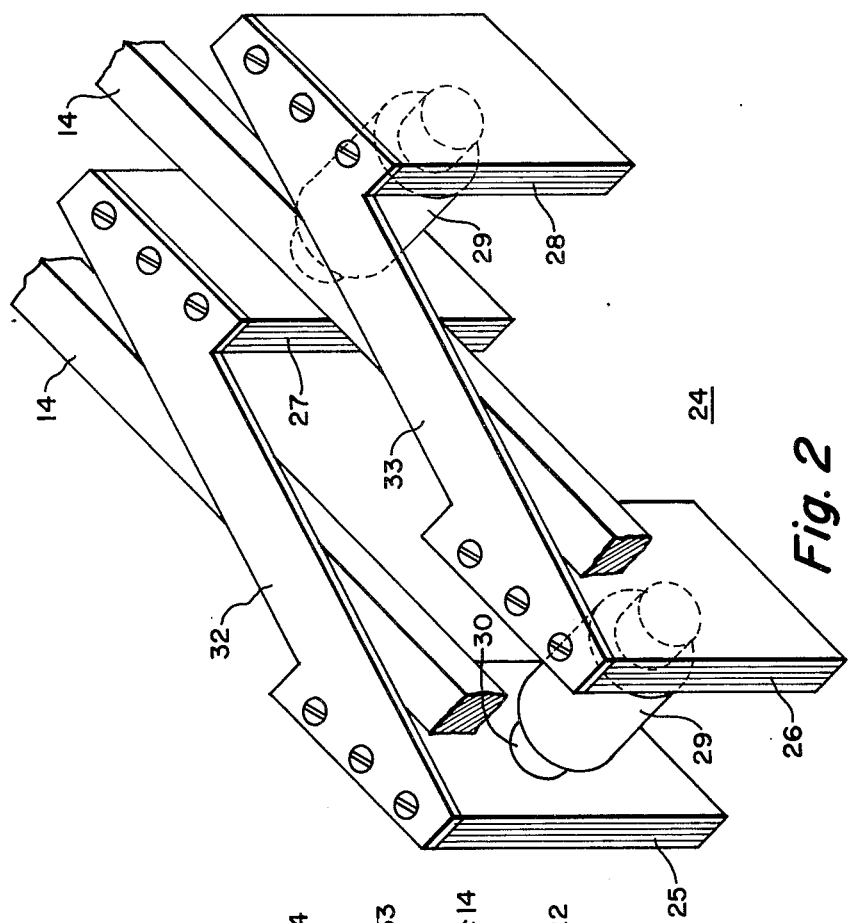
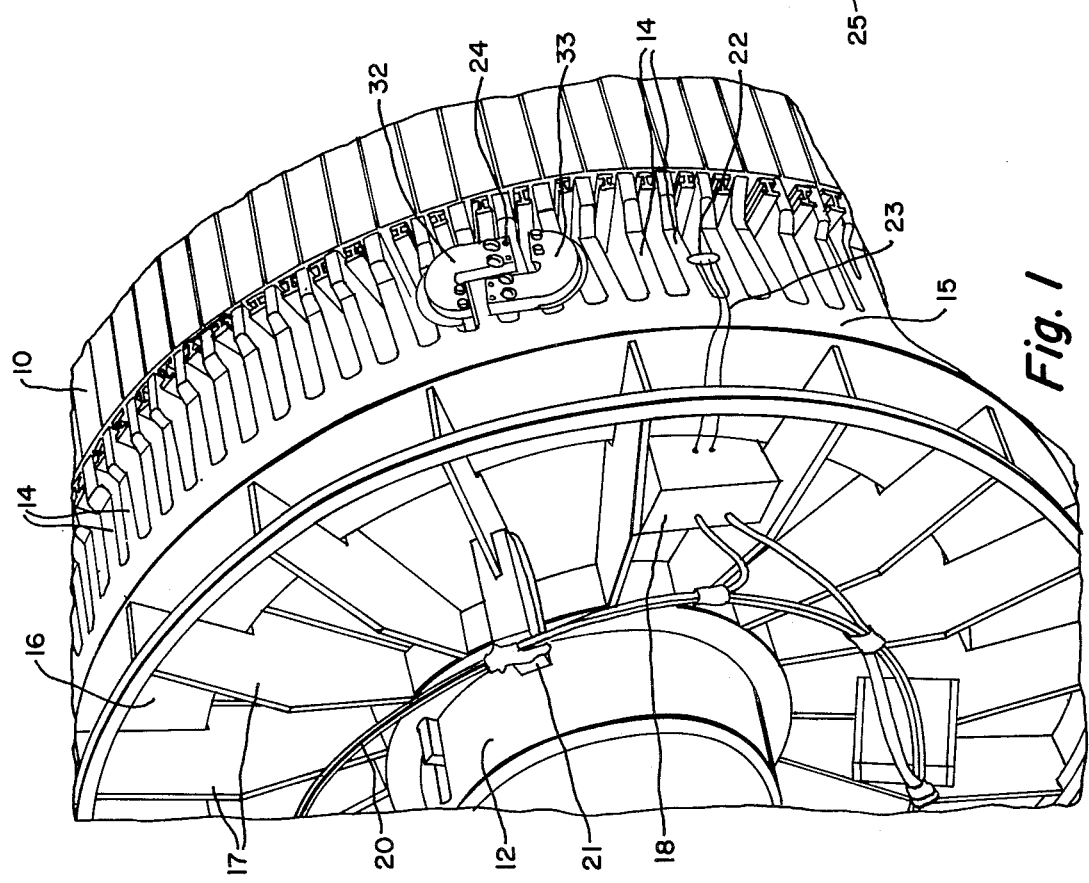

ROTOR OVERTEMPERATURE PROTECTION FOR ELECTRIC MOTORS

BACKGROUND OF THE INVENTION

The present invention relates to overtemperature protection for electric motors, and more particularly, to protection against excessive temperature of the rotor winding bars of squirrel-cage induction motors.

Squirrel-cage induction motors in the smaller sizes normally have cast squirrel-cage rotor windings of aluminum alloy, and overtemperature of the rotor winding is not usually a problem in motors of this size. In larger induction motors, however, squirrel-cage windings consisting of copper or copper-alloy bars brazed or otherwise joined to copper-alloy end rings are commonly used. Under locked rotor conditions, or under high slip conditions, such as at starting, very high currents occur in the rotor winding bars of these larger motors, while the cooling airflow is at a minimum when the motor is at standstill or running at low speed. Very high bar temperatures can, therefore, occur but as the motor accelerates, the rotor currents decrease and the airflow increases so that the bars do not reach dangerous temperatures if the motor accelerates normally. Under some conditions, however, the rotor bar temperature rise may become excessive. Thus, if the motor stalls, or starts slowly and does not accelerate normally, very high temperatures can result. This may occur when driving high inertia loads, for example, or if the line voltage is abnormally low, so that the motor starts very slowly. Repeated starting of the motor with insufficient cooling time between starts can also cause excessive temperature. Under any of these conditions, the temperatures may become high enough to soften or melt the brazed connections of the bars to the end rings or cause other damage resulting in mechanical or electrical failure.

Protection against overtemperature of the rotor bars has presented a difficult problem because of the difficulty of getting temperature information from the rotor while it is rotating. Slip rings have been tried for this purpose but are not satisfactory because of the space required and because they are not sufficiently reliable. Transmission of temperature signals from the rotor by means of radio transmitters, or by the use of rotary transformers having one winding on the rotor and another winding on the stator, have also been proposed as shown, for example, in Smith U.S. Pat. No. 3,824,857. Such arrangements are undesirable, however, since rotary transformers are relatively bulky devices requiring substantial extra space for the windings on both rotor and stator, and a second rotary transformer is also required to provide power to the signal transmitting transformer. If a radio transmitter is used on the rotor, a power source must also be provided for the transmitter, which may be a rotary transformer with the disadvantages just mentioned, or a battery which is necessarily of substantial size and weight and involves mechanical mounting and balancing problems as well as possible reliability problems. This type of solution to the problem of overtemperature protection, therefore, has not heretofore been found to be satisfactory. It has also been attempted to avoid the problem entirely by imposing restrictions on the type of load with which the motor may be used, or by limiting the number of starts that can be made in a given time. This approach, however, is undesirable because users and operators of these motors have a very strong tendency to disregard such instructions.

SUMMARY OF THE INVENTION

In accordance with the invention, a protective system is provided for squirrel-cage rotors in which a transmitter is mounted on the rotor and controlled by a temperature sensing element, such as a thermistor, in contact with one of the rotor bars. The transmitter is powered by a special current transformer utilizing two of the rotor bars themselves as a primary winding, with a special core arrangement such that the two bars act as a one-turn primary. In this way, a very simple and lightweight system is provided including the power supply, which can readily be mounted on the rotor and which does not present any serious mechanical or reliability problems. The transmitter sends out a radio-frequency carrier signal which is modulated at the slip frequency of the rotor, and the temperature sensor controls an audio-frequency oscillator to further modulate the carrier at the audio frequency in response to excessive temperature.

A stationary receiver is mounted on the stator of the motor, or other convenient place, to pick up the signal from the transmitter. The receiver includes means for detecting the slip frequency modulated signal as a reliability check and prevents energization of the motor unless this signal is received to show that the transmitter is operating properly. In case of overtemperature, receipt of the audio-frequency modulated signal causes switching circuitry included in the receiver to deenergize the motor, preferably by opening the main contactor. Manual START and STOP buttons are also provided to allow manual control of the motor. In this way, a relatively simple but highly reliable protective system is provided for detecting overtemperature in the rotor bars of a squirrel-cage induction motor, and deenergizing the motor in response to temperature above a predetermined value.

BRIEF DESCRIPTION OF THE DRAWINGS

The invention will be more fully understood from the following detailed description, taken in connection with the accompanying drawing, in which:

FIG. 1 is a perspective view of one end of a typical squirrel-cage rotor showing the transmitter portion of the protective system mounted on the rotor;

FIG. 2 is a somewhat diagrammatic perspective view illustrating the arrangement of the current transformer core with respect to the rotor bars;

DESCRIPTION OF THE PREFERRED EMBODIMENT

Figure 3:
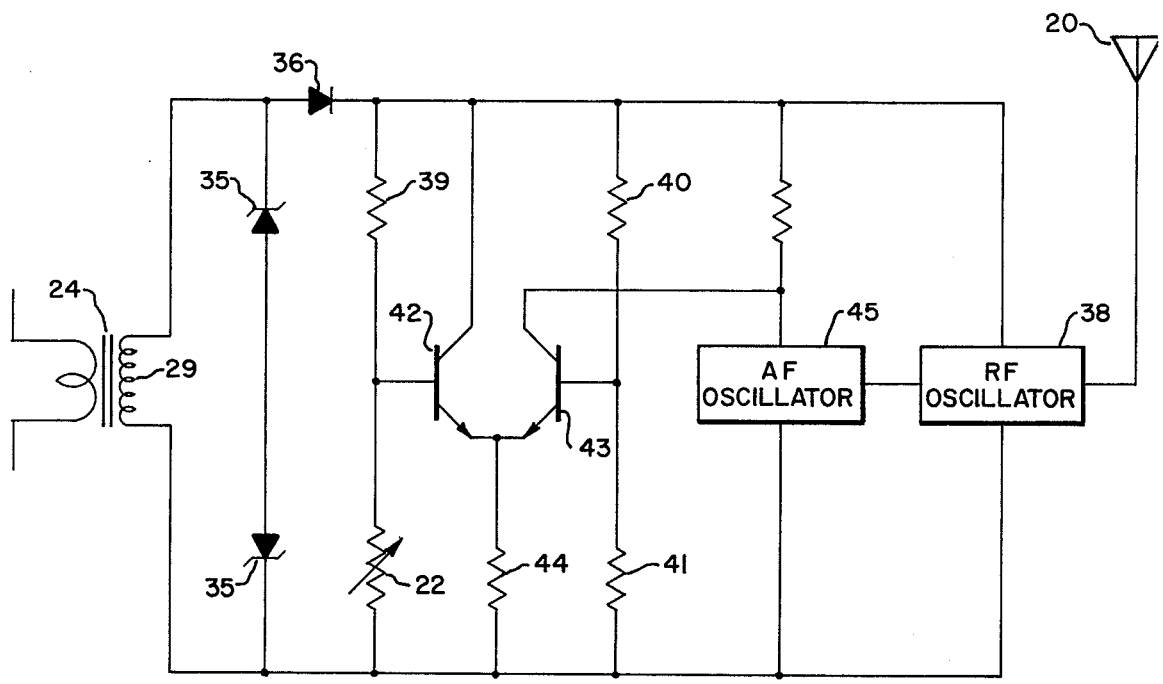
FIG. 3 is a schematic diagram of the transmitter which is carried on the rotor.

The invention is shown in the drawing in an illustrative embodiment as applied to the protection of a large squirrel-cage rotor of typical construction. As shown in FIG. 1, such a rotor consists of a laminated magnetic core 10 carried on a shaft 12. The rotor winding consists of a plurality of bars 14 of copper, or copper alloy, disposed in longitudinal slots in the core 10 and connected at their ends to an end ring 15 by brazed connections to form a squirrel-cage winding. A fan 16 of any suitable type is mounted on the end ring 15 to circulate ventilating air.

As discussed above, a rotor of this type is subject to excessive temperature of the bars 14 under certain conditions, and these temperatures may become high enough to weaken or destroy the brazed connections of the bars to the end rings 15, or to cause other types of mechanical or electrical failure. In accordance with the invention, such an overtemperature condition is detected by the portion of the protective system shown mounted on the rotor in FIG. 1. This portion of the system consists essentially of a temperature sensor, a transmitter and a power supply for the transmitter. In the illustrated embodiment, the transmitter 18 is shown as being mounted between two of the blades 17 of the fan 16 although it could, of course, be mounted in any suitable location on the rotor. The transmitter 18 is connected to an antenna 20 which consists of several turns of wire supported on insulators 21 which may also be mounted on the fan 16. Any suitable type of temperature sensor could be used to respond to the winding temperature but it is preferred to use a thermistor 22 mounted on or joined to one of the bars 14 in a manner to respond to the temperature of the bar. The thermistor 22 is connected to the transmitter 18 by suitable leads indicated at 23 which may be carried over the ring 15 as shown and secured thereto as by cementing.

In accordance with one feature of the invention, the power supply for the transmitter 18 is derived from the rotor currents themselves, thus avoiding the necessity for bulky and heavy rotary transformers or batteries. As shown in FIGS. 1 and 2, the power source consists of a special current transformer generally indicated at 24 which utilizes two of the rotor bars 14 as a primary winding. The construction of the transformer 24 is shown somewhat diagrammatically in FIG. 2. As there shown, the transformer 24 includes two laminated core sections 25 and 26 placed on opposite sides of one rotor bar 14, and two similar core sections 27 and 28 placed on opposite sides of the next adjacent bar 14, the core sections 26 and 27 being disposed between the two adjacent bars and axially spaced from each other. The secondary winding 29 of the transformer is divided into two coils placed on yoke members 30 and connected together to function as a single secondary winding. One of the yoke members 30 connects the core sections 25 and 26, extending under the corresponding bar 14, while the other yoke member 30 connects the core sections 27 and 28 and extends under the other bar 14. A yoke element 32 completes the magnetic circuit around the first bar 14 and extends across the bar between the core sections 25 and 27, being attached to them by screws or in any suitable manner. A similar yoke element 33 extends between the core sections 26 and 28 across the other bar 14 to complete the magnetic circuit.

It will be seen from examination of FIG. 2 that the result of this arrangement is that the currents in the two adjacent rotor bars are in opposite directions with respect to the core structure. Since the currents in adjacent bars are out of phase by a relatively small angle determined by the number of rotor bars and the number of stator poles, there is a net primary current and the effect is to minimize the number of primary ampere-turns. A correspondingly small number of secondary ampere-turns is required and the necessary size of the core structure is accordingly minimized. This special transformer construction is an important feature of the invention as it can readily be produced from magnetic laminations, and can easily be installed in place in the manner shown in FIG. 1 around two of the rotor bars.

A sufficient power supply is thus provided for the transmitter 18, especially at lower speeds of the rotor where the heating problem is most acute, since the currents are of greater magnitude and frequency at that time. The transformer is sufficiently small and light to be easily mounted on the rotor bars in the manner shown without introducing any substantial balancing or other mechanical problems. The necessity for large and heavy batteries or transformer windings on the rotor is thus avoided and a simple, reliable power source is provided utilizing the rotor currents themselves to supply power to the transmitter.

The transmitter 18 itself is shown in FIG. 3. As there shown, the output voltage of the current transformer 24 is limited by two Zener diodes 35 connected back-to-back across the secondary winding 29, so that the transformer is symmetrically loaded on both half-cycles of the output. A diode 36 is connected in series with the transformer secondary to function as a half-wave rectifier through which the transmitter 18 is powered. The transmitter comprises a radio-frequency oscillator 38 which may be of any desired type and which may be tuned for any desired output frequency in the radio-frequency range, a suitable frequency being 10.7 MHz, for example. The oscillator 38 generates a radio-frequency carrier signal and its output is radiated from the antenna 20. Since the oscillator 38 is connected directly across the transformer secondary 29 in series with the half-wave rectifier 36, its output is modulated at the slip frequency of the rotor, so that the antenna 20 continuously radiates the carrier signal modulated at the slip frequency.

The transmission of an overtemperature signal is controlled by the thermistor 22 which, as previously described, is in direct contact with a rotor bar 14 to respond to its temperature. The thermistor 22 is connected in a resistance bridge which also includes resistors 39, 40 and 41. Corresponding points on the bridge are connected to two transistors 42 and 43 connected as a dual transistor with the emitters joined and connected to a resistor 44. The arrangement is such that when the resistance of thermistor 22 is greater than that of the resistor 41, the transistor 42 is conducting and transistor 43 is cut off. When the temperature of the rotor winding increases, the resistance of the thermistor 22 decreases, and when it falls below a value corresponding to the maximum permissible rotor temperature, it falls below the resistance of resistor 41. Transistor 42 is then cut off and transistor 43 conducts. Transistor 43 controls an audio-frequency oscillator 45 which may be of any suitable type and which may have an output of any desired audio frequency, a nominal output frequency of 10 KHz, for example, being suitable. When the transistor 43 becomes conductive, therefore, the oscillator 45 is turned ON and its output is applied to the radio-frequency oscillator 38 to further modulate the radio-frequency carrier signal at the frequency of the oscillator 45. The audio-frequency modulation then provides the desired signal indicating an overtemperature condition. It will be understood that the transmitter 18 may be of any suitable type controlled by a temperature sensing device to emit a radio-frequency carrier signal modulated in the manner described.

Figure 4:
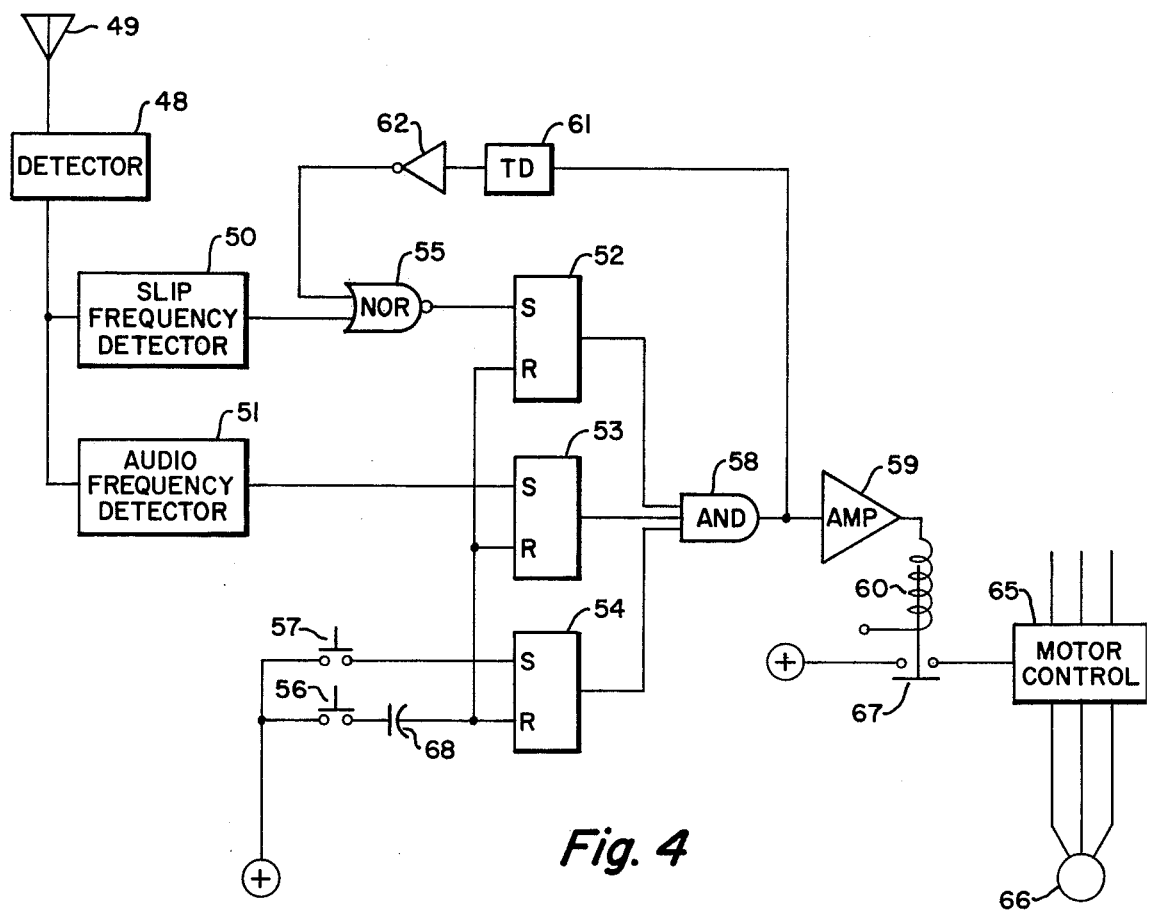
FIG. 4 is a schematic diagram showing the stationary receiver and associated control circuitry.

The stationary receiver and control portion of the protective system is shown schematically in FIG. 4. The receiver consists of a detector 48 of any suitable type with an antenna 49 which may be a loop antenna mounted inside the stationary housing of the motor, or in any other suitable location where it can pick up the signals from the transmitter antenna 20. The detector 48 may be located in any convenient place on or near the motor for connection to the antenna 49, and may be of any suitable type of receiver, preferably including an automatic gain control loop which maintains constant output amplitude. The demodulated signal from the detector 48 is applied to two amplifier detectors 50 and 51 with different passbands. The amplifiers 50 and 51 may be of any suitable type and are preferably similar except for the frequency bands. The first amplifier or detector 50 responds to the slip frequency modulation of the transmitter signal and has a very wide passband of the order of 0.33 Hz to 24 KHz, for example, so that it responds to the slip frequency modulation throughout the entire range of slip frequencies of the motor. The second amplifier detector 51 responds to the audio-frequency modulation which indicates overtemperature, and for this purpose has a more limited passband which may be of the order of 2.4 KHz to 24 KHz, for example, although the width and limits of the frequency band are not critical so long as the detector responds to the audio-frequency modulation of the transmitter carrier signal.

The control and switching functions of the system may be carried out by any suitable type of logic circuitry. As shown in FIG. 4 this may comprise three flip-flops 52, 53 and 54 each arranged to have an output when the reset terminal has been pulsed and no output when the set terminal has been pulsed. The output of the slip frequency detector 50 is applied to the set terminal of flip-flop 52 through a NOR gate 55. The output of the audio-frequency detector 51 is applied directly to the set terminal of the flip-flop 53. A Start pushbutton 56 and a Stop pushbutton 57 are provided for manual control and are connected to control the third flip-flop 54. The output signals of all three flip-flops 52, 53 and 54 are connected to an AND gate 58 and the output signal of the gate 58 is connected, preferably through an amplifier 59, to actuate a motor control relay 60. The output of the AND gate 58 is also connected to a time-delay circuit 61 which includes an inverter 62 and to the NOR gate 55 previously mentioned.

The relay 60 is connected as shown to control and energize a motor controller 65 when the relay 60 is energized and closes its contact 67. The motor control 65 may be of any suitable or conventional type including a main contactor to connect the motor 66 to a three-phase power line and may, if desired, include any other necessary or usual control or protective features. The arrangement is such that when the relay contact 67 closes, the motor control 65 is energized to cause the motor 66 to be connected to the line for operation, and when the contact 67 opens, the motor is disconnected from the line.

The START button 56 is connected to the reset terminals of all three of the flip-flops 52, 53 and 54 so that they can all be reset simultaneously by momentarily closing the START button 56, and the STOP button 57 is connected to the set terminal of flip-flop 54. The START button is preferably coupled to the flip-flops through a capacitor 68 so it supplies only a momentary pulse of current when closed, and STOP signals cannot be overridden by holding the START button down.

In operation, the motor 66 is started by depressing the START button 56 which resets all three flip-flops so that an output signal is present from each of them. These three output signals result in an output from the AND gate 58 to energize the relay 60 and cause the motor to be energized. At the same time the output signal from the AND gate 58 is also applied to the time-delay circuit 61, but because of the time delay there is no immediate output and the inverter 62 supplies an input signal to the NOR gate 55. After the predetermined time has elapsed, the signal from the AND gate 58 is passed by the time-delay circuit 61 and is inverted, resulting in zero input to the NOR gate 55. If the transmitter system on the rotor is operating properly, the slip frequency modulated signal will be received during this time and the detector 50 will have an output which is applied to the NOR gate 55. This gate, therefore, will have zero output so that the flip-flop 52 remains in the reset state and the relay 60 continues to be energized. If, however, there is any malfunction in the transmitter, or any problem which prevents proper operation, the slip frequency modulated signal is not received and there is no output from detector 50 to the NOR gate 55. When the signal from the inverter 62 becomes zero at the end of the time-delay period, the gate 55 will then have an output to set the flip-flop 52 so that its output signal becomes zero. The output of the AND gate 58, therefore, ceases and the relay 60 is deenergized so that the motor cannot be started. A safety check is provided in this way to make sure that the protective system is working before the motor is allowed to start. That is, the time-delay circuit provides a short sampling period during which the slip frequency signal can develop and if at the end of this period the signal is not being received from the detector 50, a malfunction is indicated and the motor is prevented from starting so that it cannot operate without the protective system.

If overtemperature of the rotor bars occurs during operation, for any reason, such as stalling of the motor or an abnormally slow start, the thermistor 22 is correspondingly heated and turns ON the audio-frequency oscillator 45 to modulate the radio-frequency carrier signal of the transmitter. This aduio-frequency modulated signal is received by the detector 51 and its output is applied directly to set the flip-flop 53 so that the output signal of the flip-flop goes to zero. The output of the AND gate 58 is, therefore, interrupted and the relay 60 is deenergized to stop the motor 66. The motor can also be stopped manually at any time by momentarily closing the STOP button 57 which sets the flip-flop 54 to interrupt its output signal, with the same result.

It will be seen that a protective system is thus provided which involves small lightweight components which can be mounted on the rotor without difficulty, and which requires no large, bulky or heavy power source for the transmitter. A safety check is provided to be sure the system is operating properly before the motor can be started. This is an important feature because of the use of the rotor current itself to supply power since the rotor currents and frequency decrease as the motor comes up to speed and the available power for the transmitter may be quite limited during normal operation of the motor. The danger of overheating of the motor winding occurs during starting, however, at very low rotor speeds, or under stalled or locked rotor conditions, and ample power for the transmitter is available under such conditions where the rotor currents are high and the slip frequency is also high. A safety check is provided, as described above, to insure that the protective system is operating properly before the motor can be started. Full protection is, therefore, reliably provided during the time when overheating of the rotor winding may occur. After the motor has reached normal speed, the rotor currents are relatively lower, so that less heat is generated, and the flow of cooling air is at the maximum. Rotor overtemperature is, therefore, not a problem during operation at normal speed.

What is claimed is:

1. In combination with an electric motor having a rotor member carrying a squirrel-cage winding, temperature sensing means on said rotor responsive to the temperature of said winding, a transmitter on the rotor controlled by said temperature sensing means to transmit a signal of predetermined characteristics when said temperature exceeds a predetermined value, transformer means on the rotor associated with the rotor winding for supplying power to said transmitter from current flowing in the winding, and a stationary receiver adapted to receive signals from said transmitter and including means for effecting deenergization of the motor in response to a signal of said predetermined characteristics.

2. The combination of claim 1 in which said rotor winding includes a plurality of parallel conductor bars, and said transformer means comprises a core structure and a secondary winding associated with certain of said bars to constitute a current transformer.

3. The combination of claim 2 in which said core structure is associated with two adjacent bars of the rotor winding in a manner such that the currents in the two bars are opposing with respect to the core structure and the bars constitute a one-turn primary winding for the transformer.

4. The combination of claim 3 in which said core structure comprises first and second core sections disposed on opposite sides of one of said bars and connected by a yoke member extending under said one bar, third and fourth core sections disposed on opposite sides of the other of said bars and connected by a yoke member extending under said other bar, said second and third core sections being disposed between the two bars, said transformer secondary winding being disposed on said yoke members, a yoke element connecting the first and third core sections above said one bar, and a yoke element connecting the second and fourth core sections above said other bar.

5. The combination of claim 1 in which said transmitter includes means for producing a high-frequency carrier signal, means for modulating said carrier signal at the slip frequency of the motor, said receiver including means for detecting said slip frequency modulated signal, and means for deenergizing the motor if said signal is not received.

6. The combination of claim 5 in which said slip frequency modulating means comprises a half-wave rectifier connected between the transformer means and the transmitter.

7. The combination of claim 5 in which the receiver includes means for providing a temporary signal for a limited time upon initial energization of the motor to maintain energization of the motor independently of said slip frequency modulated signal.

8. The combination of claim 5 in which said transmitter includes means for modulating said carrier signal in an audio-frequency range in response to rotor winding temperature above a predetermined value, said receiver including means for detecting said audio-frequency modulated signal, and means for effecting deenergization of the motor in response to said signal.

9. The combination of claim 8 and including manual means for effecting energization and deenergization of the motor.

* * * * *